United States Patent [19]
Cochran et al.

[11] Patent Number: 6,113,032
[45] Date of Patent: Sep. 5, 2000

[54] DELIVERING LIQUID PROPELLANT IN A REUSABLE BOOSTER STAGE

[75] Inventors: David B. Cochran; Charles D. Limerick, both of Bellevue, Wash.

[73] Assignee: Kistler Aerospace Corporation, Kirkland, Wash.

[21] Appl. No.: 09/030,645

[22] Filed: Feb. 25, 1998

[51] Int. Cl.[7] .................................................. B64G 1/22
[52] U.S. Cl. .............................. 244/135 R; 244/158 R; 244/172
[58] Field of Search ........................... 244/135 R, 135 C, 244/158 R, 172

[56] References Cited

U.S. PATENT DOCUMENTS

| | | | |
|---|---|---|---|
| 3,242,811 | 3/1966 | Swet | 244/172 |
| 3,286,629 | 11/1966 | Laue | 102/49 |
| 3,304,724 | 2/1967 | Blumrich et al. | 60/257 |
| 3,702,688 | 11/1972 | Fagel | 244/158 R |
| 3,910,037 | 10/1975 | Salkeld | 60/250 |
| 3,934,512 | 1/1976 | Adachi | 244/172 |
| 4,451,017 | 5/1984 | Marshall | 244/172 |
| 4,609,169 | 9/1986 | Schweickert et al. | 244/169 |

(List continued on next page.)

OTHER PUBLICATIONS

Robert L. Staehle, et al., "Crew Transportation for the 1990s: Commercializing Manned Flight with Today's Propulsion," *World Space Foundation*, 1989, 19 pages.

A. P. Bruckner, et al., "IAF 92–0859 Antares: A Low cost Modular Launch Vehicle Concept," *43rd Congress of the International Astronautical Federation*, Aug./Sep., 1992, pp. 1–13.

H. O. Ruppe, "Design Considerations For Future Space Launchers," *Acta Astronautica*(?), vol. 29, No. 9, 1993, pp. 705–722 (printed in Great Britain), Pergamon Press Ltd.

Seven J. Isakowitz, International Reference Guide to Space Launch Systems, *American Institute of Aeronautics and Astronautics*, 1991, 295 pages.

Gary C. Hudson, "Phoenix: A Commercial, Reusable Single–Stage Launch Vehicle," *Pacific American Launch Systems, Inc.*, date unknown, pp. 1–13.

D. E. Koelle, et al., "The Single–Stage Reusable Ballistic Launcher Concept for Economic Cargo Transportation," *37th Congress of the International Astronautical Federation*, Oct., 1986, 7 pages.

Rudi Beichel, et al., "The Next Generation Rocket Engines," *39th Congress of the International Astronautical Federation*, Oct., 1988, 7 pages.

*Primary Examiner*—Galen L. Barefoot
*Attorney, Agent, or Firm*—Baker Botts L.L.P.

[57] ABSTRACT

A system is provided for delivering liquid propellant in a booster stage of a launch vehicle. The system includes an arrangement of tanks and valves to direct a first supply of liquid propellant during ascent of the booster stage and a second supply during descent of the booster stage. In disclosed embodiments, tanks may be arranged in series or parallel.

34 Claims, 4 Drawing Sheets

6,113,032
Page 2

U.S. PATENT DOCUMENTS

| | | | |
|---|---|---|---|
| 4,699,339 | 10/1987 | Rosen et al. | 244/158 R |
| 4,723,736 | 2/1988 | Rider | 244/172 |
| 4,802,639 | 2/1989 | Hardy et al. | 244/158 R |
| 4,811,556 | 3/1989 | Lau et al. | 60/206 |
| 4,817,890 | 4/1989 | Coffinberry | 244/135 R |
| 4,835,959 | 6/1989 | Coffinberry | 60/212 |
| 4,840,025 | 6/1989 | Coffinberry | 60/217 |
| 4,841,723 | 6/1989 | Lau et al. | 60/204 |
| 4,884,770 | 12/1989 | Martin | 244/158 R |
| 4,912,925 | 4/1990 | Foust | 60/259 |
| 4,976,398 | 12/1990 | Bruhn | 244/135 R |
| 5,027,597 | 7/1991 | Soeffker et al. | 60/243 |
| 5,031,857 | 7/1991 | MacConochie et al. | 244/3.28 |
| 5,058,833 | 10/1991 | Carmouche | 244/158 R |
| 5,064,153 | 11/1991 | Gindre et al. | 244/172 |
| 5,071,093 | 12/1991 | Perdu | 244/135 R |
| 5,116,000 | 5/1992 | Girard | 244/135 R |
| 5,129,602 | 7/1992 | Leonard | 244/172 |
| 5,141,181 | 8/1992 | Leonard | 244/172 |
| 5,143,327 | 9/1992 | Martin | 244/158 R |
| 5,251,852 | 10/1993 | Pulkowski et al. | 244/135 |
| 5,279,323 | 1/1994 | Grove et al. | 137/154 |
| 5,295,642 | 3/1994 | Palmer | 244/2 |
| 5,299,840 | 4/1994 | Heye | 285/114 |
| 5,456,424 | 10/1995 | Palmer | 244/2 |
| 5,531,067 | 7/1996 | Koppel | 60/259 |
| 5,564,648 | 10/1996 | Palmer | 244/2 |
| 5,568,901 | 10/1996 | Steinnon | 244/63 |
| 5,582,366 | 12/1996 | Hamant et al. | 244/135 R |
| 5,626,310 | 5/1997 | Kelly | 244/2 |
| 5,651,515 | 7/1997 | Saccoccia et al. | 244/158 R |
| 5,667,167 | 9/1997 | Kistler | 244/110 E |

DELIVERING LIQUID PROPELLANT IN A REUSABLE BOOSTER STAGE

TECHNICAL FIELD OF THE INVENTION

This invention relates generally to the field of launch vehicles, and more particularly to delivering liquid propellant in a reusable booster stage.

BACKGROUND OF THE INVENTION

Multi-stage launch vehicles have been used to deliver payloads into orbit above the Earth and, in some cases, beyond. With such launch vehicles, one or more large and expensive booster stages are used to accelerate a payload up to a velocity sufficient to enter orbit. Typically, after each booster stage has served its intended purpose, it is separated from the remainder of the launch vehicle and discarded. Although this is clearly wasteful, during earlier times the very novelty of space exploration was sufficient to justify the costs. With the increased need and frequency of space launches, the large costs associated with expendable booster stages have become commercially significant.

With many previous multi-stage launch vehicles, recovery of a booster stage was impractical or impossible. Most prior designs store liquid propellant in a single tank. During ascent of these prior launch vehicles, forces due to acceleration direct the liquid propellant to a feed line at the bottom of the tank to supply propellant to the engines. At main engine cut-off (MECO), any liquid propellant remaining in the single tank may disperse, boil off, or otherwise degrade in quality.

SUMMARY OF THE INVENTION

In accordance with the present invention, a system and method are provided for delivering liquid propellant in a reusable booster stage of a multi-stage launch vehicle.

According to an embodiment of the present invention, a system is provided for delivering liquid propellant in a booster stage of a launch vehicle. The system includes a first tank which holds liquid propellant. A second tank is connected in series with the first tank so that the liquid propellant flows from the first tank through the second tank during an ascent of the booster stage. A first valve is disposed between the first tank and the second tank. The first valve terminates the connection between the first tank and the second tank so that the second tank retains at least a portion of the liquid propellant for use during descent of the booster stage.

According to another embodiment of the present invention, a method is provided for delivering liquid propellant to a booster stage of a launch vehicle. The method includes the following steps: directing a liquid propellant from a first tank through a second tank during an ascent of the booster stage; terminating a connection between the second tank and the first tank; and directing the liquid propellant from the second tank during a descent of the booster stage.

According to yet another embodiment of the present invention, a system for delivering liquid propellant to a booster stage of a launch vehicle includes a first supply of liquid propellant and a second supply of liquid propellant. At least one valve directs liquid propellant so that the booster stage uses the first supply of liquid propellant during ascent and the second supply of liquid propellant during descent.

According to still another embodiment of the present invention, a method is provided for operating a booster stage of a launch vehicle. The method comprises the following steps: igniting an engine of the booster stage; directing a liquid propellant from a first tank to the engine through a second tank during an ascent of the booster stage; terminating a connection between the second tank and the first tank upon detection of a predetermined event; shutting off the engine; separating the booster stage from a remainder of the launch vehicle; re-igniting the engine; and directing the liquid propellant from the second tank to the engine during a descent of the booster stage.

Important technical features of the present invention include providing multiple tanks for holding liquid propellant in a booster stage of a launch vehicle. The liquid propellant held in a first of these tanks may be delivered to one or more engines of the booster stage during ascent. As this occurs, the first tank empties most or all of its liquid propellant. A second tank, which can be isolated from the first tank at some point during operation, retains a portion of the same liquid propellant, or alternatively, holds an altogether separate supply of liquid propellant for delivery to the engines during descent. The isolation of the first and second tanks ensures that liquid propellant in the second tank does not seep into the emptiness of the first tank when forces are applied to the launch vehicle. Because dispersion and boil-off of liquid propellant may depend on surface area, the retention of liquid propellant in the second tank minimizes these effects. Thus, the liquid propellant from the second tank to the engines is of high quality and uniform flow to maximize performance of the engines during the descent of the booster stage. Other technical advantages are readily apparent to one skilled in the art from the following figures, descriptions, and claims.

BRIEF DESCRIPTION OF THE DRAWINGS

For a more complete understanding of the present invention, and for further features and advantages, reference is now made to the following description, taken in conjunction with the accompanying drawings, wherein like reference numerals represent like parts, in which.

DETAILED DESCRIPTION OF THE INVENTION

The present invention and its advantages are best understood by referring to FIGS. 1–5 of the drawings, like numerals being used for like and corresponding parts of the various drawings.

Figure 1:
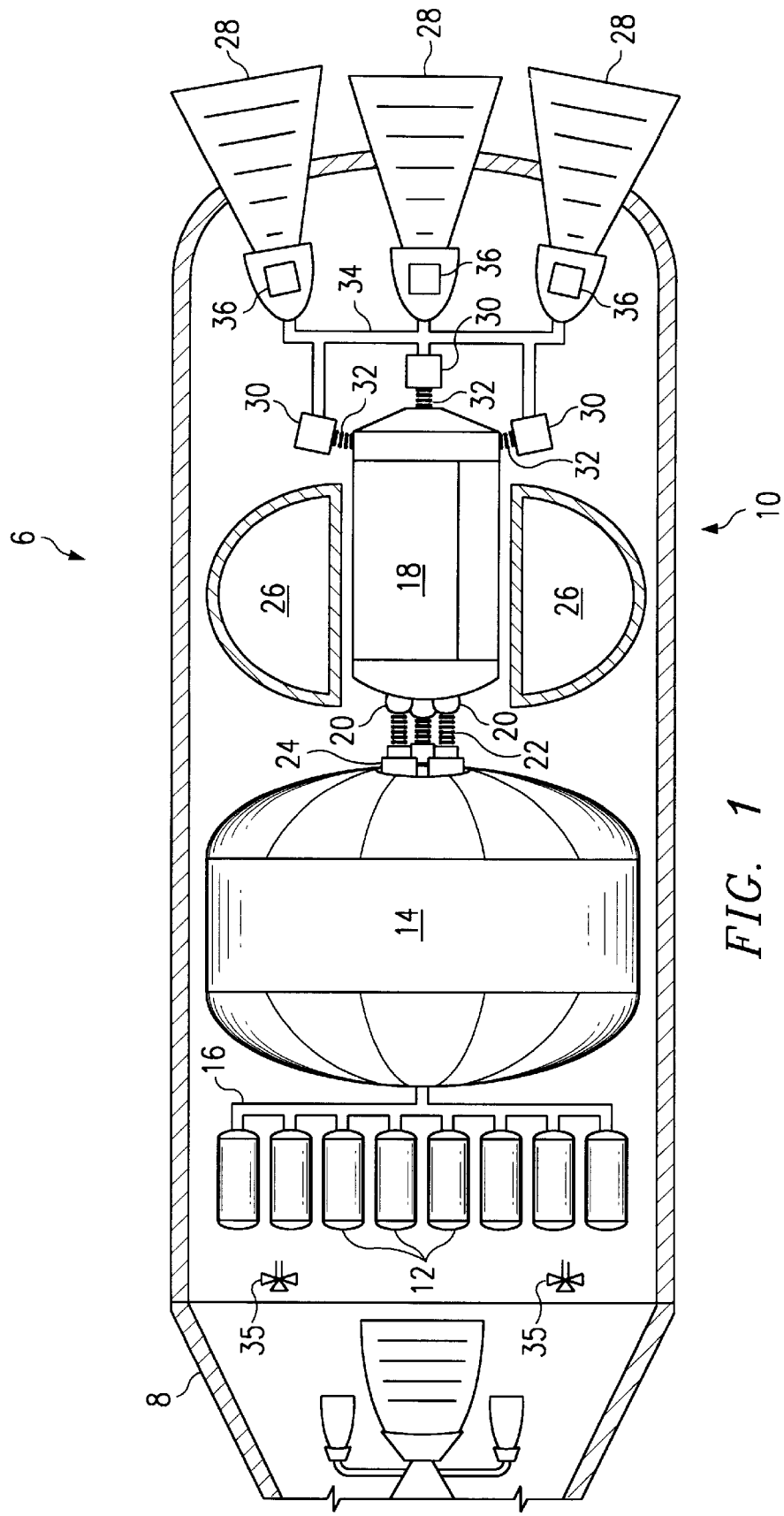
FIG. 1 is a cut-away view of one embodiment of a booster stage of a launch vehicle, in accordance with the teachings of the present invention.

FIG. 1 is a cut-away view of a launch vehicle 6 that includes an upper stage or orbital vehicle 8 and a booster stage 10. Although shown as two stages, launch vehicle 6 may include more stages. Booster stage 10 includes one or more pressurization tanks 12, each of which contains a nitrogen, helium, or other suitable gas. This gas provides pressurization to other tanks within booster stage 10, as described below in more detail.

Generally, booster stage 10 contemplates a single liquid propellant, two liquid propellants (oxidizer and fuel), or more liquid propellants to combine into a combustible mixture. As shown, a first tank 14 may hold or store a supply of liquid propellant, such as liquid oxygen (LOX), which combines with another liquid propellant (e.g., kerosene) to provide a combustible mixture. First tank 14 is connected to pressurization tanks 12 via a line and/or manifold 16. First tank 14 may be formed of any suitable material, such as aluminum or stainless steel, and in any suitable shape, such as spherical, cylindrical, or a variation thereof, for holding the liquid propellant. First tank 14 holds enough liquid propellant to propel booster stage 10 on an ascent phase of a flight profile for launch vehicle 6. It should be understood that the ascent phase may have both vertical and horizontal components that are perpendicular and parallel, respectively, to the Earth's surface.

A second tank 18 is coupled to first tank 14 via one or more valves 20 and corresponding bellows 22. Like first tank 14, second tank 18 contains or stores a supply of liquid propellant, which can be the same as, or separate from, the liquid propellant held within first tank 14. In the embodiment shown in FIG. 1, second tank 18 connects in series with first tank 14 so that liquid propellant from first tank 14 flows through second tank 18. Similar to first tank 14, second tank 18 may be formed from any suitable material, and in any suitable shape, for holding liquid propellant. Second tank 18 holds enough liquid propellant for a return descent or flight of booster stage 10. This descent phase may have both vertical and horizontal components.

One or more valves 20 regulate the flow of liquid propellant from first tank 14 into second tank 18. Although three valves 20 are depicted in FIG. 1, it should be understood that any suitable number of valves can be utilized, based upon such factors as valve size, tank size, desired flow rate, commercial availability, and the like. Preferably, valves 20 are formed from steel or other material suitable to withstand the large amounts of pressure exerted by liquid propellant and the potential oxidizing effect of liquid propellant. Valves 20 can be in a triangular arrangement, or in other suitable arrangement. A separate bellows 22 associated with each valve expands and contracts as tanks 14 and 18 move in response to thrust forces generated by booster stage 10.

A control device 24 is disposed proximate to, or contained within one of, first tank 14 and valves 20. Control device 24 functions to close one or more valves 20 upon the occurrence of a predetermined event, such as the lapse of a predefined interval, the detection of a predetermined flow rate through valves 20, a predetermined barometric pressure, a predetermined level of liquid propellant within first tank 14, or other condition or event that indicates the termination of the ascent phase of the flight. Thus, control device 24 can be implemented as any one or a combination of suitable devices, including a chronometer, a flow sensor, a barometer, and a pressure sensor. The predetermined event may coincide with the moment at which booster stage 10 reaches a predefined point for main engine cut-off (MECO) and separation from upper stage or orbital vehicle 8.

A third tank 26 (shown in cross-section) holds a supply of another liquid propellant, such as liquid fuel (e.g., RP-1, kerosene), which when combined and combusted with the first liquid propellant (e.g., LOX) provides thrust to booster stage 10. Third tank 26 can be formed from any of a number of suitable materials, and in any number of suitable shapes. In a particular embodiment, tank 26 comprises composite materials for increased strength and reduced weight. As illustrated, third tank 26 is formed roughly in the shape of a donut to accommodate second tank. Suitable materials can be used to insulate third tank 26 from second tank 18 so that each of the liquid propellants are maintained at desired temperatures and in desired physical states.

A plurality of engines 28 are coupled to second tank 18 via a combination of one or more pre-valves 30, corresponding bellows 32, and line and/or manifold 34. It should be understood that a suitable arrangement of valves, feed line and/or manifold connects third tank 26 to engines 28. Pre-valves 30 operate during ground fueling procedures to fill tanks 14, 18, and 26 and to circulate liquid propellants through the system prior to launch to maintain the quality of the propellants. Typically, pre-valves 30 remain open throughout the flight of launch vehicle 6.

As shown, booster stage 10 includes three engines 28, with one engine 28 extending along a central axis of booster stage 10. The other engines 28 extend off center from the centrally located engine 28 and can be canted at a suitable angle (e.g., six degrees). Engines 28 may be connected to a suitable thrust structure and gimballing assembly for directing or controlling the thrust forces generated by engines 28. At engines 28, liquid propellants (such as LOX and kerosene) combine and combust to provide thrust for booster stage 10.

Each engine 28 includes an associated engine valve 36 that regulates the flow of liquid propellant from second tank 18 to engines 28. Closing engine valve 36 terminates the flow of propellants and shuts down the associated engine 28. Three pre-valves 30 and three engine valves 36 are depicted in FIG. 1, but booster stage 10 contemplates any suitable number and arrangement of pre-valves and engine valves, based upon valve size, tank size, desired flow rate, commercial availability, or any other suitable factors. The term "valves" generally refers to valves 20, pre-valves 30, and/or engine valves 36. A separate bellows 32 associated with each engine feedline expands and contracts as components of booster stage 10 move in response to thrust forces created by engines 28.

Although not explicitly shown, booster stage 10 may also include an appropriate landing system for reducing or cushioning the impact to booster stage 10 upon landing. This landing system may comprise any one, or a combination of, airbags, parachutes, and other suitable devices, which are strategically placed throughout booster stage 10 for deployment at the appropriate moment. Furthermore, booster stage 10 may comprise appropriate control thrusters 35 for directing the orientation of the booster stage.

In operation, during ascent of booster stage 10, valves 20, 30, and 36 are opened. Pressurization gas from pressurization tanks 12 forces liquid propellant to flow from first tank 14, through second tank 18, to engines 28. At engines 28, the liquid propellant combines and combusts with liquid propellant from third tank 26 to generate thrust to boost launch vehicle 6 towards space. As long as the engines 28 remain on and launch vehicle 6 accelerates through the atmosphere, the associated thrust forces aid the flow of liquid propellant from first tank 14 into second tank 18. Engine valves 36 may be adjusted to control or throttle engines 28 as desired.

Upon the occurrence of a predetermined event (e.g., the lapse of a predefined interval of time, the detection of a predetermined flow rate through valves 20, a predetermined barometric pressure, a predetermined level of liquid propellant within first tank 14), control device 24 closes valves 20, thereby terminating at least a part of the fluid connection between first tank 14 and second tank 18. The predetermined event may coincide with the moment at which booster stage 10 reaches a predefined point for main engine cut-off and separation. Closed valves 20 retain liquid propellant within second tank 18. At this point, second tank 18, is full or nearly full to prevent excessive boil-off and dispersion of liquid propellant.

Before, during, or after closing valves 20, engine valves 36 close, which deprives engines 28 of fuel and causes main engine cut-off. Booster stage 10 then separates from the remainder of launch vehicle 6. Control thrusters 35 re-orient booster stage 10 in a return path directed toward a chosen landing area. Since valves 20 are closed, the liquid propellant remaining in second tank 18 does not significantly disperse during deceleration and re-orientation of booster stage 10. This is an important technical advantage in that second tank 18, with valves 20 closed, maintains the quality of the liquid propellant.

Prior to engine re-ignition and return of booster stage 10, valves 20 are re-opened, thus allowing pressurization gas to force the liquid propellant retained in second tank 18 to engines 28. At least one engine valve 36 opens to start at least one engine 28 (e.g., the center engine) to provide thrust along the desired return path. A single engine may be used because less thrust is needed to direct and accelerate the booster stage 10 during descent. The center engine may be selected to provide thrust through the center of gravity of booster stage 10 to improve stability and controllability. The liquid propellant provided to the re-ignited engine 28 is of high quality and uniform flow because little or no dispersion and/or boil-off of propellant occurred within second tank 18. Accordingly, the re-ignited engine 28 operates at maximum, or near-maximum, performance during descent. Like the ascent phase, engine valve 36 may be controlled to throttle restarted engine 28 as desired.

Figure 2:
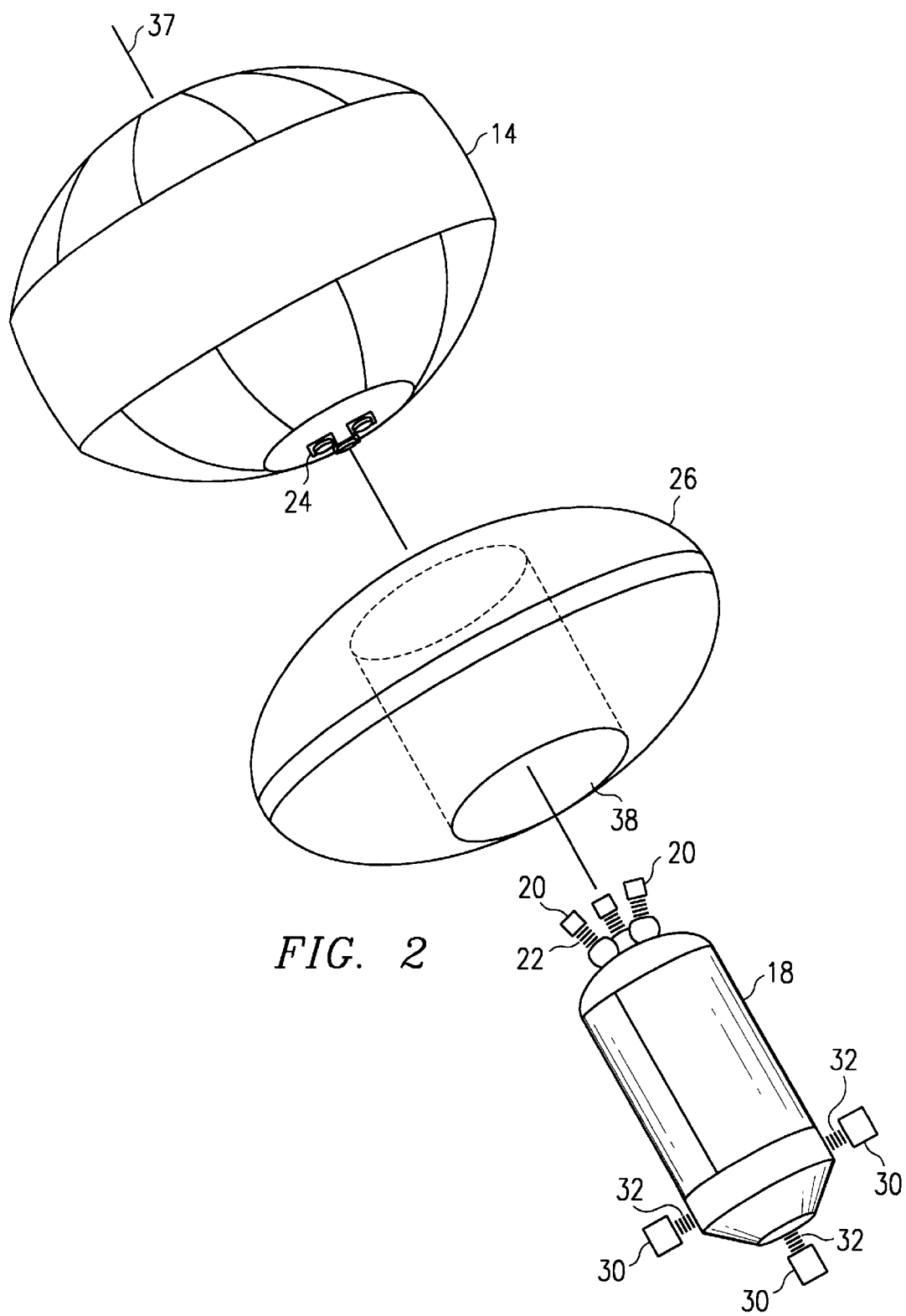
FIG. 2 is a perspective view of the first, second, and third tanks of the booster stage.

FIG. 2 is a perspective view of first tank 14, second tank 18, and third tank 26 shown in FIG. 1. Also visible are valves 20, bellows 22, control device 24, pre-valves 30, and bellows 32. As described above, first tank 14 and second tank 18 store liquid propellant, such as LOX, and third tank 26 stores a suitable liquid fuel, such as kerosene. In this embodiment, first tank 14, second tank 18, and third tank 26 are arranged along a central axis 37 of booster stage 10 to provide stability and desirable weight distribution through the flight of booster stage 10. With this centrally aligned configuration of tanks, the center of gravity of booster stage 10 moves substantially along central axis 37. Furthermore, FIG. 2 clearly illustrates a tunnel or opening 38 formed in third tank 26 to accommodate second tank 18.

Figure 4:
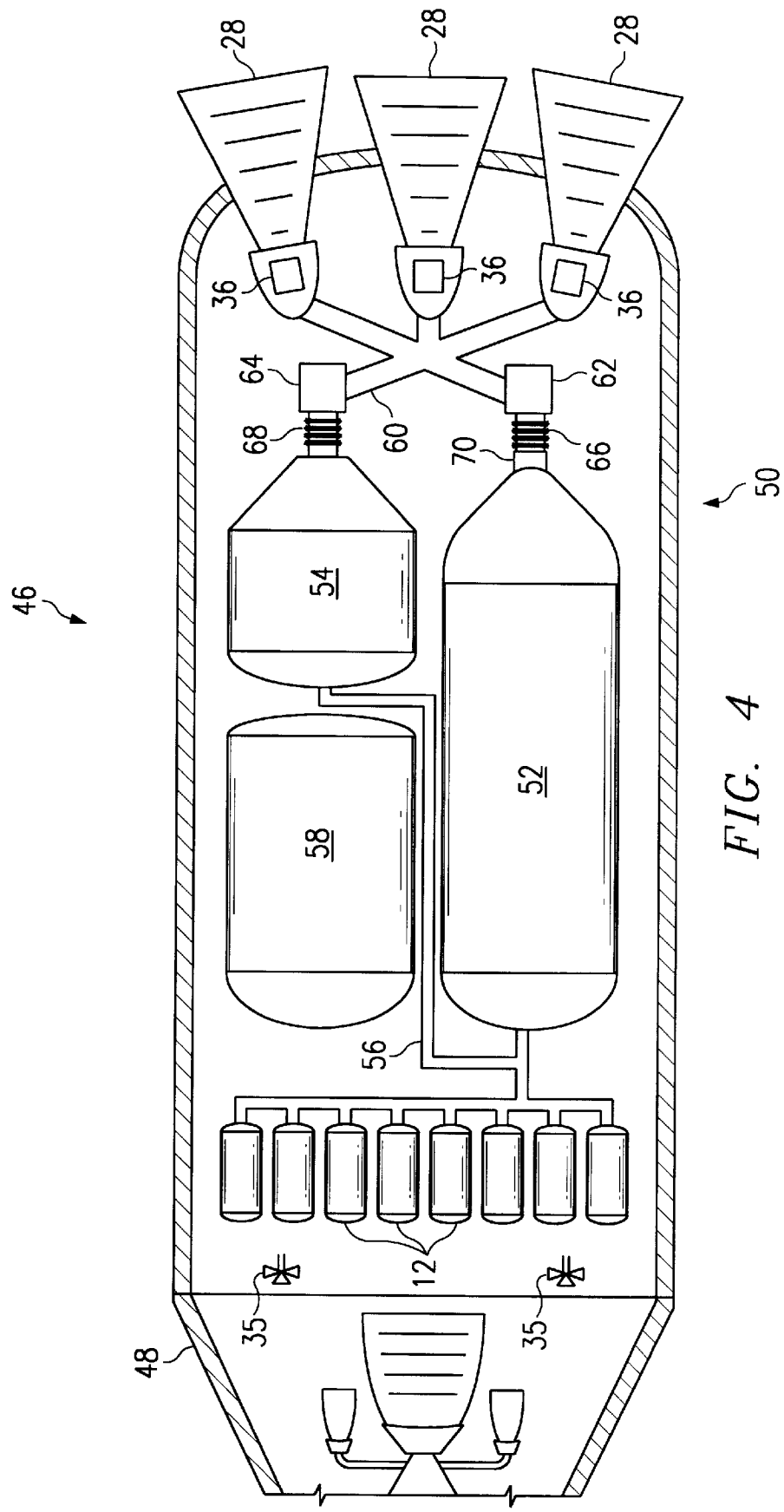
FIG. 4 is a cut-away view of another embodiment of a booster stage of a launch vehicle, in accordance with the teachings of the present invention.

Although one configuration for the first, second, and third tanks has been described and illustrated with reference to FIGS. 1 and 2, it should be understood that a number of other configurations are possible, and indeed, contemplated by the present invention. For example, the second and third tanks may be arranged in parallel with the first tank, as shown in FIG. 4. Alternatively, the first, second, third tanks may be arranged in series along the central axis of the booster stage.

Figure 3:
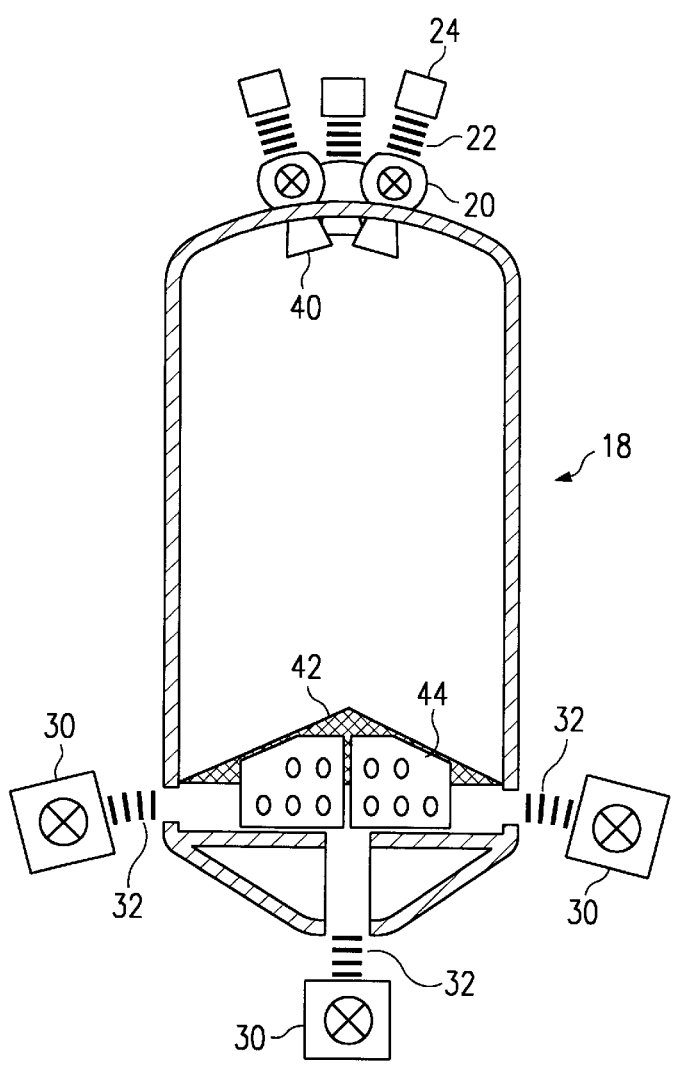
FIG. 3 is a cross-sectional view of the second tank.

FIG. 3 is a cross-sectional view of second tank 18 shown in FIGS. 1 and 2. Second tank 18 includes one or more diffusers 40 near valves 20 that diffuse pressurization gas (from pressurization tanks 12) which enters second tank 18 from first tank 14 when the supply of liquid propellant within first tank 14 has been substantially exhausted or depleted. Diffusion of the pressurization gas is desirable to reduce its dispersion throughout the liquid propellant within second tank 18. When pressurization gas disperses, it forms bubbles in the liquid propellant, which, in turn, could disperse to expose more surface area in the liquid propellant and cause increased boil off.

Second tank 18 also includes a propellant management screen 42 and an anti-vortex device 44 near pre-valves 30. Propellant management screen 42 comprises panels of mesh disposed over a suitable framework that provide surface tension and capillary action to collect liquid propellant for uninterrupted delivery to engines 28. Propellant management screen 42 also serves to separate and trap any bubbles formed by the dispersion of pressurization gas throughout the liquid propellant in second tank 18, thereby providing a more uniform and continuous flow of liquid propellant at pre-valves 30. Anti-vortex device 44 includes perforated panels that reduce or eliminate vortices as liquid propellant drains from second tank 18 into outlets for delivery to engines 28.

Booster stage 10 contemplates that components similar to diffusers 40, propellant management screen 42, and anti-vortex device 44 may be included in first tank 14 to provide the same functionality described above.

FIG. 4 is a cut-away view of a launch vehicle 46 that includes an upper stage or orbital vehicle 48 and a booster stage 50. Booster stage 50 comprises a number of elements which are the same as, or similar to, those of booster stage 10 shown in FIG. 1. These elements include one or more pressurization tanks 12, engines 28, engine valves 36, and thrusters 35.

Booster stage 50 includes a first tank 52 and a second tank 54 coupled to pressurization tanks 12 by a line and/or manifold 56 for delivery of pressurization gas. First tank 52 and second tank 54 hold liquid propellant, such as liquid oxygen or liquid hydrogen, and may be formed from any of a number of suitable materials and in any of a number of suitable shapes. Booster stage 50 uses the liquid propellant in first tank 52 during ascent and the liquid propellant in second tank 54 during descent. The size and capacity of first tank 52 and second tank 54 corresponds to the amount of liquid propellant needed during the respective ascent and descent of booster stage 50. Both first tank 52 and second tank 54 include a number of elements (e.g., diffusers, propellant management screen, anti-vortex device) which are the same as, or similar to, the elements of second tank 18 shown and described with reference to FIG. 3. A third tank 58 stores liquid fuel, such as kerosene or RP-1, which combines and combusts with liquid propellant to provide thrust for booster stage 50. Third tank 58 couples to engines 28 via a suitable line, downcomer, and/or manifold so that liquid fuel may be delivered to engines 28.

A feed line and/or manifold 60 delivers liquid propellant from first tank 52 and second tank 54 to engines 28. A valve 62 regulates the flow of liquid propellant from first tank 52, while a valve 64 regulates the flow from second tank 54. Bellows 66 and 68 disposed near valves 62 and 64, respectively, expand and contract as needed in response to thrust forces generated by engines 28. In a particular embodiment, valves 62 and 64 alone or in combination perform similar functions as valves 20 and pre-valves 30 in booster stage 10 of FIG. 1.

A control device 70 near or within first tank 52 or valve 62 closes valve 62 upon the occurrence of a predetermined event, which may coincide with the point in flight for main engine cut-off and separation. The predetermined event can be the lapse of a predefined interval, or the detection of a predetermined flow rate through valve 62, a predetermined barometric pressure, or a predetermined level of liquid propellant within first tank 52, or other event or condition. Control device 70 may be any suitable device or collection of devices, including a chronometer, a flow sensor, a barometer, and a pressure sensor, that can sense this event. Control device 70 also may open/close valve 64 and engine valves 36.

Engine valves 36 regulate the flow of liquid propellants to engines 28. Engine valves 36 associated with the two side engines can be closed during descent of booster stage 50 so that only the centrally aligned engine 28 receives liquid propellants for in-flight propulsion.

In operation, valve 62 opens at launch so that liquid propellant flows from first tank 52 to engines 28 for combination and combustion with liquid propellant from third tank 58. The combustion provides propulsion or thrust for booster stage 50 upon ascent. Engine valves 36 may be adjusted to control or throttle engines 28. During ascent, valve 64 remains closed to retain liquid propellant within second tank 54. Upon the occurrence of the predetermined event coinciding with the point for main engine cut-off and upper stage separation, control device 70 closes valve 62 and/or engine valves 36, which causes engines 28 to shut-off so that booster stage 50 can separate from the remainder of launch vehicle 46. Booster stage 50 then re-orients for descent along a return path directed toward a chosen landing area.

For powered descent of booster stage 50, valve 64 and one or more engine valves 36 open to deliver the liquid propellant retained in second tank 54 to one or more engines 28. In one embodiment, engine valves 36 are configured so that only the centrally aligned engine 28 receives liquid propellant. This centrally aligned engine 28 re-ignites to provide thrust along the desired return path. The feed of liquid propellant to the re-ignited engine 28 is continuous and uniform because the supply of liquid propellant in second tank 54 was previously immobilized, and thus, not affected by the deceleration and re-orientation of booster stage 50. This ensures a high quality and continuous flow of liquid propellant during the return descent. Like the ascent phase, engine valve 36 may be controlled to throttle restarted engine 28 as desired. After booster stage 50 returns to the desired landing area, it may be recovered for re-use.

Figure 5:
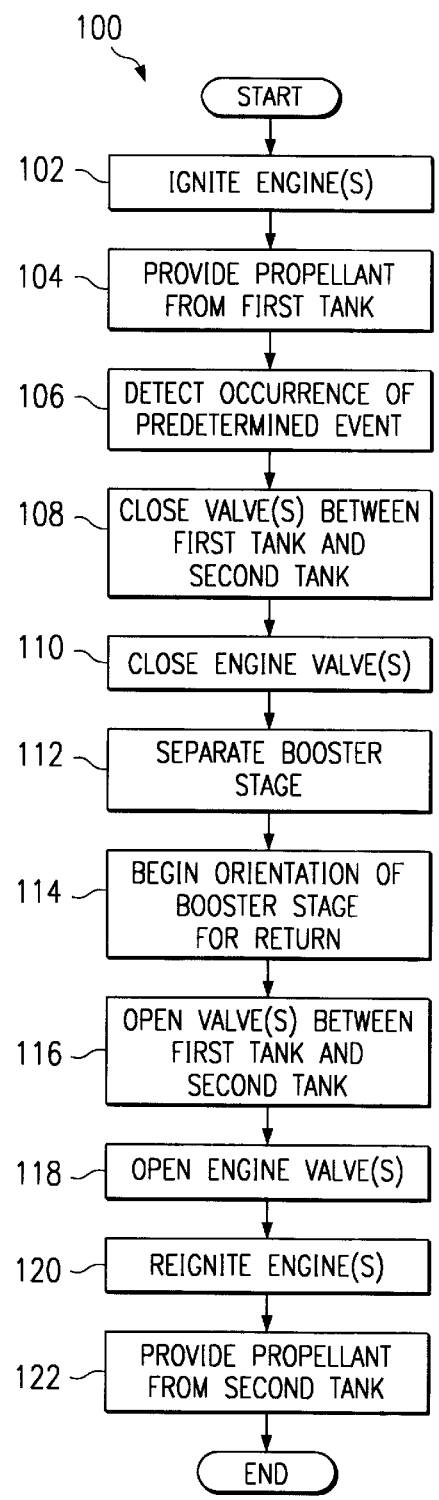
FIG. 5 is a flow diagram of a method for delivering liquid propellant in a booster stage of a launch vehicle, in accordance with the present invention.

FIG. 5 is a flow diagram of a method 100 for delivering liquid propellant in a booster stage 10 of launch vehicle 6. A similar method would be applicable to booster stage 50. Method 100 begins at step 102 where engines 28 of booster stage 10 ignite for launch. During ascent of launch vehicle 6, liquid propellant flows from first tank 14 through second tank 18 to engines 28 at step 104. This liquid propellant combines with liquid fuel from third tank 26 and combusts at engines 28 to provide propulsive forces to booster stage 10.

At step 106, control device 24 detects the occurrence of a predetermined event, such as the lapse of a predefined interval of time, the attainment of a certain elevation as measured in barometric pressure, flow of liquid propellant through valve 20 at a specified rate, or the depletion of liquid propellant in first tank 14 to a predefined level. Upon this detection, control device 24 closes valves 20 at step 108 to terminate or reduce the flow of liquid propellant from first tank 14 to second tank 18. Second tank 18 retains a supply of liquid propellant for descent. Preferably, at closure, second tank 18 is filled to capacity or near capacity with liquid propellant so that the propellant is substantially immobilized and its surface area minimized within second tank 18.

At step 110, engine valves 36 close to deprive the flow of liquid propellant to engines 28, which causes main engine cut-off. Engine valves 36 may close before, during, or after closure of valves 20, depending upon the particular implementation. Booster stage 10 separates from the remainder of launch vehicle 6 at step 112, and begins the orientation for a return descent to earth using control thrusters 35 at step 114. This orientation may be performed before, during, or after opening valves 20 in step 116 for starting at least one engine 28.

During the descent of booster stage 10, valves 20 between first tank 14 and second tank 16 open at step 116 so that pressurization gas from pressurization tanks 12 force liquid propellant toward engines 28. One or more engine valves 36 open to supply liquid propellant from second tank 18 to one or more engines 28 at step 118. At least one engine 28 (e.g., the center engine) re-ignites at step 120. Second tank 18 delivers a high quality and continuous flow of liquid propellant to engines 28 at step 122.

Although the present invention has been described in several embodiments, a myriad of changes, variations, alterations, transformations, and modifications may be suggested to one skilled in the art, and it is intended that the present invention encompass such changes, variations, alterations, transformations, and modifications as fall within the spirit and scope of the appended claims.

What is claimed is:

1. A system for delivering liquid propellant in a booster stage of a launch vehicle, the system comprising:
   a first tank operable to hold liquid propellant;
   a second tank connected in series with the first tank so that the liquid propellant flows from the first tank through the second tank during an ascent of the booster stage; and
   a first valve disposed between the first tank and the second tank, the first valve operable to terminate the connection between the first tank and the second tank so that the second tank retains at least a portion of the liquid propellant for use during descent of the booster stage.

2. The system of claim 1, further comprising at least one pressurization tank coupled to the first tank, the pressurization tank operable to hold a supply of pressurization gas for forcing liquid propellant from the first tank into the second tank.

3. The system of claim 2, further comprising at least one diffuser operable to diffuse pressurization gas which enters into the second tank.

4. The system of claim 1, further comprising a bellows coupled to the first valve, the bellows operable to expand and contract in response to thrust forces.

5. The system of claim 1, further comprising:
   a propellant management screen operable to collect liquid propellant flowing through the second tank; and
   an anti-vortex device operable to reduce vortices as liquid propellant drains from the second tank.

6. The system of claim 1, further comprising a second valve operable to regulate flow of liquid propellant from the second tank to the engine.

7. The system of claim 1, wherein the liquid propellent comprises liquid oxygen.

8. The system of claim 1, further comprising a third tank operable to hold an additional liquid propellant to combine with the liquid propellant for combustion.

9. The system of claim 1, further comprising a control device operable to close the first valve upon the occurrence of a predetermined event.

10. The system of claim 9, wherein the predetermined event comprises at least one of a lapse of a predetermined interval, a detection of a predetermined barometric pressure, a detection of a predetermined level of liquid propellant within the first tank, and a detection of a predetermined flow rate through the first valve.

11. The system of claim 9, wherein the control device comprises at least one of a chronometer, a flow sensor, a barometer, and a pressure sensor.

12. The system of claim 1, wherein the booster stage does not achieve earth orbit between the ascent of the booster stage and the descent of the booster stage.

13. The system of claim 8, wherein the first tank, the second tank, and the third tank are arranged along the central axis of the booster stage.

14. The system of claim 8, wherein the third tank is configured in a substantially toroidal shape formed around the central axis of the second tank.

15. A method for delivering liquid propellant to a booster stage of a launch vehicle, the method comprising:
   directing a liquid propellant from a first tank through a second tank during an ascent of the booster stage;
   terminating a connection between the second tank and the first tank; and
   directing the liquid propellant from the second tank during a descent of the booster stage.

16. The method of claim 15, wherein:
   directing a liquid propellant from a first tank further comprises directing the liquid propellant to a plurality of engines; and
   directing the liquid propellant from the second tank further comprises directing the liquid propellant to a selected one of the plurality of engines.

17. The method of claim 15, further comprising the step of separating the booster stage from a remainder of the launch vehicle after terminating the connection.

18. The method of claim 15, further comprising the step of orienting the booster stage after terminating the connection.

19. The method of claim 15, further comprising the step of terminating a connection from the second tank to an engine of the booster stage before descent.

20. The method of claim 15, further comprising the step of forcing liquid propellant from the first tank into the second tank using a pressurization gas.

21. The method of claim 15, further comprising the step of collecting the liquid propellant using a propellant management screen and an anti-vortex device proximate an end of the second tank where the liquid propellant exits the second tank.

22. The method of claim 15, wherein the step of terminating further comprises the step of detecting the occurrence of a predetermined event.

23. The method of claim 22, wherein the predetermined event comprises at least one of a lapse of a predetermined interval, a detection of a predetermined barometric pressure, a detection of a predetermined level of liquid propellant within the first tank, and a detection of a predetermined flow rate through the first valve.

24. The method of claim 15, wherein the booster stage transitions between the ascent and the descent without entering earth orbit.

25. A system for delivering liquid propellant to a booster stage of a launch vehicle, the system comprising:
   a first supply of liquid propellant;
   a second supply of liquid propellant; and
   at least one valve operable to direct liquid propellant so that an engine of the booster stage uses the first supply of liquid propellant during ascent and the second supply of liquid propellant during descent.

26. The system of claim 25, further comprising:
   a first tank operable to hold the first supply; and
   a second tank operable to hold the second supply.

27. The system of claim 25, further comprising a supply of an additional liquid propellant to combine with the first supply and second supply of liquid propellant for combustion.

28. The system of claim 25, further comprising a control device operable to switch the valve upon the occurrence of a predetermined event.

29. The system of claim 28, wherein the predetermined event comprises at least one of a lapse of a predetermined interval, a detection of a predetermined barometric pressure, a detection of a predetermined level of liquid propellant, and a detection of a predetermined flow rate through the valve.

30. The system of claim 28, wherein the control device comprises at least one of a chronometer, a flow sensor, a barometer, and a pressure sensor.

31. A method for operating a booster stage of a launch vehicle, the method comprising:
   igniting an engine of the booster stage;
   directing a liquid propellant from a first tank to the engine through a second tank during an ascent of the booster stage;
   terminating a connection between the second tank and the first tank upon detection of a predetermined event;
   shutting off the engine;
   separating the booster stage from a remainder of the launch vehicle;
   re-igniting the engine; and
   directing the liquid propellant from the second tank to the engine during a descent of the booster stage.

32. The method of claim 31, wherein the predetermined event comprises at least one of a lapse of a predetermined interval, a detection of a predetermined barometric pressure, a detection of a predetermined level of liquid propellant within the first tank, and a detection of a predetermined flow rate through the first valve.

33. The method of claim 31, further comprising the step of orienting the booster stage for return flight.

34. The method of claim 31, wherein separating the booster stage comprises separating the booster stage before the launch vehicle achieves earth orbit.

* * * * *